(12) United States Patent
Unter Ecker

(10) Patent No.: US 10,958,964 B2
(45) Date of Patent: Mar. 23, 2021

(54) DISTRIBUTED VIDEO AND GRAPHICS RENDERING SYSTEM

(71) Applicant: Telefonaktiebolaget LM Ericsson (publ), Stockholm (SE)

(72) Inventor: Oliver Unter Ecker, Los Angeles, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/237,272

(22) Filed: Dec. 31, 2018

(65) Prior Publication Data
US 2020/0213654 A1    Jul. 2, 2020

(51) Int. Cl.
| | |
|---|---|
| G06F 3/00 | (2006.01) |
| H04N 5/445 | (2011.01) |
| H04N 21/422 | (2011.01) |
| H04N 19/85 | (2014.01) |
| G06T 1/20 | (2006.01) |
| H04N 21/431 | (2011.01) |

(52) U.S. Cl.
CPC ......... *H04N 21/42204* (2013.01); *G06T 1/20* (2013.01); *H04N 19/85* (2014.11); *H04N 21/4312* (2013.01)

(58) Field of Classification Search
CPC ................................................ H04N 21/4312
See application file for complete search history.

(56) References Cited

U.S. PATENT DOCUMENTS

| | | | |
|---|---|---|---|
| 6,741,242 B1 | 5/2004 | Itoh et al. | |
| 2003/0202006 A1* | 10/2003 | Callway | H04N 21/4381 715/719 |
| 2010/0268813 A1* | 10/2010 | Pahlavan | G06F 9/452 709/224 |
| 2012/0147013 A1* | 6/2012 | Masuda | G06T 13/80 345/473 |
| 2013/0268856 A1* | 10/2013 | Hejl, Jr. | G06F 9/5027 715/716 |
| 2015/0179143 A1 | 6/2015 | Subramaniam et al. | |
| 2016/0072873 A1 | 3/2016 | Hu et al. | |
| 2016/0350061 A1* | 12/2016 | Turner | G06F 3/1454 |

OTHER PUBLICATIONS

International Search Report and Written Opinion, PCT App. No. PCT/IB2019/061046, dated Mar. 17, 2020, 14 pages.

\* cited by examiner

*Primary Examiner* — Gigi L Dubasky
(74) *Attorney, Agent, or Firm* — Nicholson De Vos Webster & Elliott LLP

(57) ABSTRACT

A receiving device receives from a base unit across a network an instruction stream that includes drawing commands for producing graphic frames of a user interface. The receiving device is connected to a display. The receiving device parses the instruction stream to determine the drawing commands and their arguments. The receiving device executes the drawing commands in a graphics engine of the receiving device to generate the graphic frames of the user interface. Executing includes performing rendering functions and interpolating coordinates for animation. The receiving device outputs the graphic frames of the user interface for display.

22 Claims, 13 Drawing Sheets

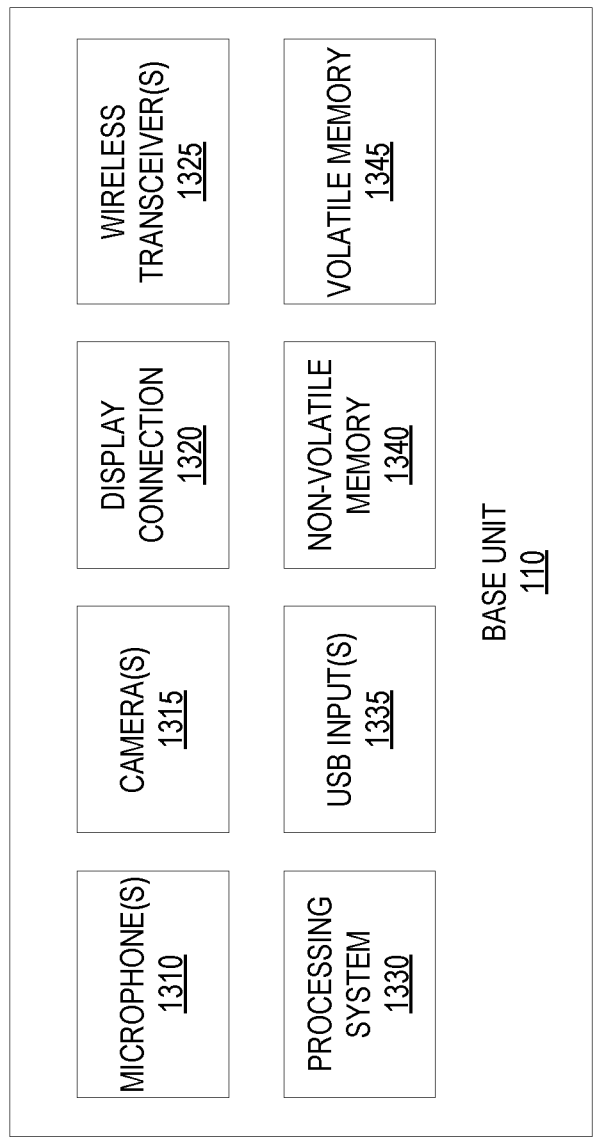

DISTRIBUTED VIDEO AND GRAPHICS RENDERING SYSTEM

TECHNICAL FIELD

Embodiments of the invention relate to the field of media devices; and more specifically, to a distributed video and graphics rendering system.

BACKGROUND ART

Modern living room media consumption experiences, consisting mostly of media watching and gaming, are realized through gaming consoles, streaming devices, set-top boxes connected to TVs, and Smart TVs. Media playback and gaming devices can be extended with inexpensive "casting sticks" that stream media or gaming content. A casting stick that streams media typically does so by receiving a media URL and streams the media content from that media URL. Casting sticks are used as an inexpensive means to provide service to another screen without incurring the expense for a full-featured entertainment device.

Casting sticks have audio/video processing and output capabilities, but they conventionally feature a simple user interface. The inexpensive hardware of the casting stick is typically not capable of running the technology stack typically used to implement user interfaces (e.g., Java, HTML5). As a result, the user experience of using a casting stick is usually inferior to that of using a main, full-featured media consumption device.

SUMMARY

A distributed video and graphics rendering system is described that includes a base unit and one or more receiving devices. The base unit receives one or more events related to the receiving device, which is communicatively coupled with the base unit over a network. The base unit determines how the one or more events inform or direct an output of what is currently rendering on the receiving device. The base unit generates an instruction stream that includes drawing commands for producing graphic frames of a user interface for the receiving device that correspond with the one or more events. Generating the instruction stream does not include performing rendering functions in a graphics engine and producing interpolated coordinates for animation. The base unit transmits, over the network, the generated instruction stream to the receiving device.

A receiving device receives from a base unit across a network an instruction stream that includes drawing commands for producing graphic frames of a user interface. The receiving device is connected to a display. The receiving device parses the instruction stream to determine the drawing commands and their arguments. The receiving device executes the drawing commands in a graphics engine of the receiving device to generate the graphic frames of the user interface. Executing includes performing rendering functions and interpolating coordinates for animation. The receiving device outputs the graphic frames of the user interface for display.

In an embodiment, the instruction stream is vector graphics-based and low-latency and allows for the generation and interaction with a user interface that is indistinguishable from being natively generated by the base unit. That is, even though the main application may be running on the base unit, it may appear to a user that each of the receiving device(s) are running the same application at its full capability.

In an embodiment, the base unit is relatively more powerful than the receiving device(s). Each receiving device is relatively inexpensive as compared to the base unit and relatively less powerful. However, when used together as described herein, a user experience on the receiving device(s) is provided that matches the user experience on the base unit. The majority of the application logic and other computational expense resides on the base unit while enabling the representation of complex and fully-featured user interface (UI) through the receiving device(s). Also, streaming different types of media is provided including video, music, and games. Thus, the replication of the user experience can be provided to multiple displays while enjoying the cost advantages offered by relatively inexpensive receiving device hardware.

BRIEF DESCRIPTION OF THE DRAWINGS

The invention may best be understood by referring to the following description and accompanying drawings that are used to illustrate embodiments of the invention. In the drawings:

FIG. 13 is a block diagram that shows an exemplary architecture of the base unit according to an embodiment

DETAILED DESCRIPTION

Figure 1:
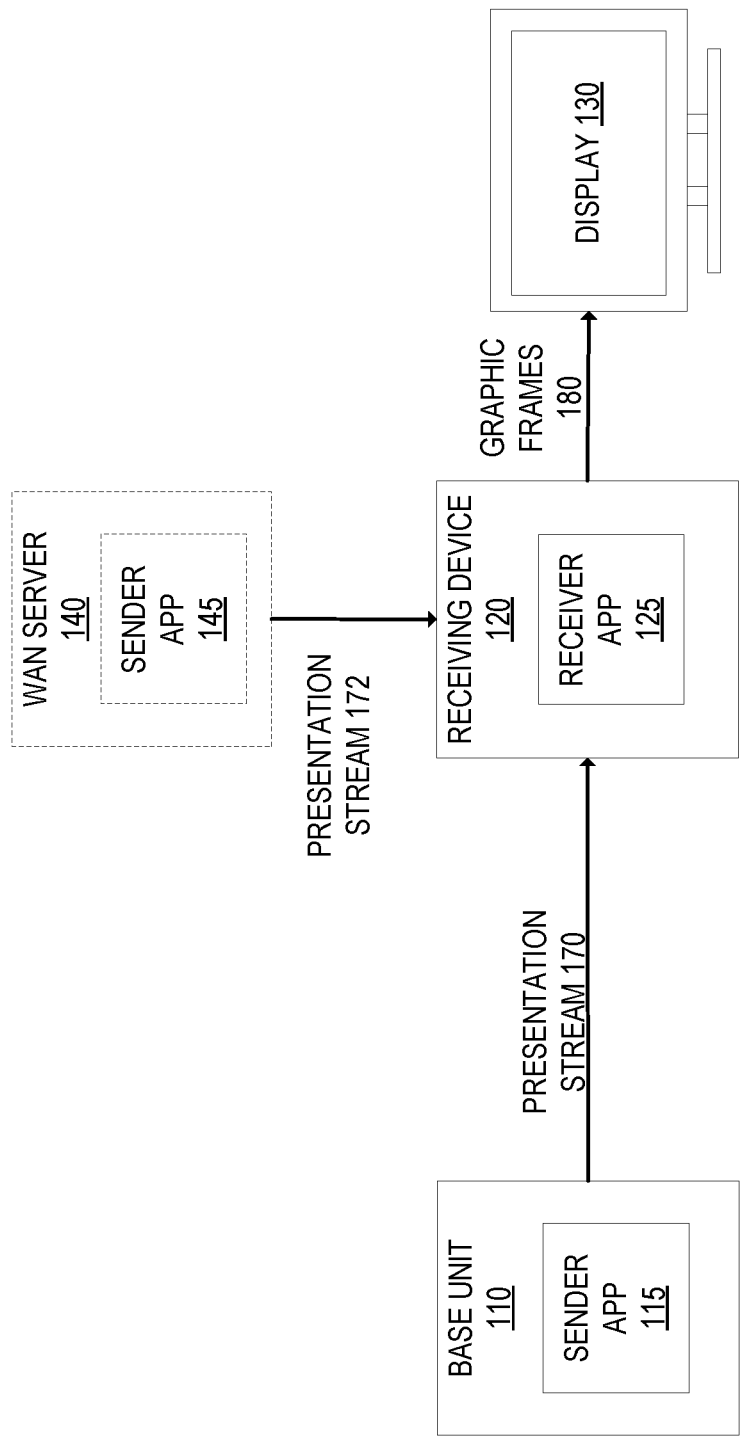
FIG. 1 shows an example of the distributed video and graphics rendering system according to an embodiment.

A distributed video and graphics rendering system is described. The system includes a base unit and a set of one or more receiving devices. The base unit transmits a presentation stream to the receiving device which in turn interprets and outputs graphic frames to a display. The base unit and/or the receiving device may receive user input (e.g., through a remote control, game controller, keyboard, mouse, gesture interpretation, voice). The receiving device may transmit the user input to the base unit for processing.

In an embodiment, the presentation stream is an instruction stream that includes drawing commands that the receiving device parses and executes to generate the graphic frames. For instance, the instruction stream includes drawing commands for a user interface and interaction with the user interface displayed through the receiving device. In such an embodiment, the receiving device includes an application to interpret the instruction stream and convert it into the graphic frames for display. In such an embodiment, the base unit does not perform rendering functions through a graphics engine and does not produce interpolated coordinates for animation when preparing the instruction stream. This reduces the compute load on the base unit.

In an embodiment, the presentation stream is a video stream encoded in a standard video format in which the receiving device decodes and outputs to the display. For instance, the video stream may be encoded using H.264, H.265, AV1, VP9, etc. and transmitted using Real-time Transport Protocol (RTP), Real-Time Messaging Protocol (RTMP), etc. The receiving device may receive a video stream from a remote WAN server in addition to, or in alternative to, receiving the video stream from the base unit.

In an embodiment, the receiving device may receive at least two concurrent streams. For instance, the receiving device may receive two instruction streams concurrently, one instruction stream and one video stream concurrently, and/or two video streams concurrently. The receiving device may output each of the concurrent streams to the same display at the same time. For instance, the receiving device may blend the concurrent streams or show them side-by-side or picture-in-picture. For instance, a video stream may be received and an instruction stream for a navigation user interface (UI) may be overlaid by the receiving device. As another example, a video stream representing a game may be received and displayed and a video stream of another video may be shown as a picture-in-picture. As another example, an instruction stream for a user interface may be received and shown side-by-side with a video of a video stream received from a remote server.

In an embodiment, the instruction stream is vector graphics-based and low-latency and allows for the generation and interaction with a user interface that is indistinguishable from being natively generated by the base unit. That is, even though the main application may be running on the base unit, it may appear to a user that each of the receiving device(s) are running the same application at its full capability.

In an embodiment, the distributed video and graphics rendering system is event-driven. In such an embodiment, the base unit and/or the receiving device may receive user input (e.g., controller input, voice input, image input) and process the user input accordingly. If the receiving device receives user input, the user input is communicated to the base unit which in turn processes the user input to inform or direct the output of what is currently rendering through the receiving device.

In an embodiment, the base unit is relatively more powerful than the receiving device(s). Each receiving device is relatively inexpensive as compared to the base unit and relatively less powerful. However, when used together as described herein, a user experience on the receiving device(s) is provided that matches the user experience on the base unit. The majority of the application logic and other computational expense resides on the base unit while enabling the representation of complex and fully-featured UI through the receiving device(s). Also, streaming different types of media is provided including video, music, and games. Thus, the replication of the user experience can be provided to multiple displays while enjoying the cost advantages offered by relatively inexpensive receiving device hardware.

FIG. 1 shows an example of the distributed video and graphics rendering system according to an embodiment. The base unit 110 is a computing device that may be a set-top box (STB), streaming device, gaming console, smart television, smart speaker, or other computing device. In an embodiment, the base unit 110 drives the receiving device 120 such as generating commands that represents the user interface to be displayed through the receiving device 120. In addition to driving the receiving device 120, the base unit 110 may also have independent functionality (e.g., acting as a STB, streaming device, gaming console, smart television, smart speaker, etc.). The base unit 110 may perform its own independent functionality concurrently with driving the receiving device 120. Although FIG. 1 illustrates a single receiving device, the base unit 110 may drive multiple receiving devices concurrently.

The base unit 110 includes the sender application 115 that generates and transmits the presentation stream 170 to the receiving device 120. The presentation stream 170 may include an instruction stream that includes drawing commands and their arguments in which the receiving device 120 parses and executes to generate the graphic frames 180 to be displayed on the display 130. The instruction stream may include commands to produce a user interface and interaction with the user interface displayed through the receiving device 120. If sending an instruction stream to the receiving device 120, the sender application 115 does not perform render functions through a graphics engine and does not produce interpolated coordinates for animation. Instead, the receiving device 120 performs the render functions and interpolation coordinates for animation. This reduces the compute load for the sender application 115 on the base unit 110.

The presentation stream 170 may include a video stream in which the receiving device 120 decodes to generate the graphic frames 180 to be displayed on the display 130. The video stream may be encoded using H.264, H.265, AV1, VP9, etc. and transmitted using Real-time Transport Protocol (RTP), Real-Time Messaging Protocol (RTMP), etc. If receiving and processing a video stream, the receiving device 120 includes an application to decode the video stream and output the decoded video stream. In an embodiment, the presentation stream 170 may include both an instruction stream and a video stream.

The presentation stream 170 may be sent over a wireless network such as Wi-Fi, Bluetooth, or other wireless network, or over a wired network such as Ethernet. The presentation stream 170 may be sent using the WebSocket protocol or other low-level network protocol. Typically, the base unit 110 and the receiving device 120 are located in the same physical structure such as in the same household unit.

The receiving device 120 is connected to the display 130 and may be relatively small (e.g., it is typically smaller than the display 130 and the base unit 110). The receiving device 120 may take the form of a casting stick. The receiving device 120 may be inserted into an HDMI port of the display 130. The receiving device 120 is relatively inexpensive as compared with the base unit 110. For example, the receiving device 120 may be implemented as a System On A Chip (SoC). The receiving device 120 includes the receiver application 125 that receives the presentation stream 170, processes the presentation stream 170, and outputs the graphic frames 180 to be displayed on the display 130.

In an embodiment, in addition to, or in lieu of receiving a presentation stream 170 from the base unit 110, the receiving device 120 receives and processes the presentation stream 172 received from a remote WAN server 140. In such an embodiment, the WAN server 140 includes a sender application 145 to generate and transmit the presentation stream 172.

Figure 2:
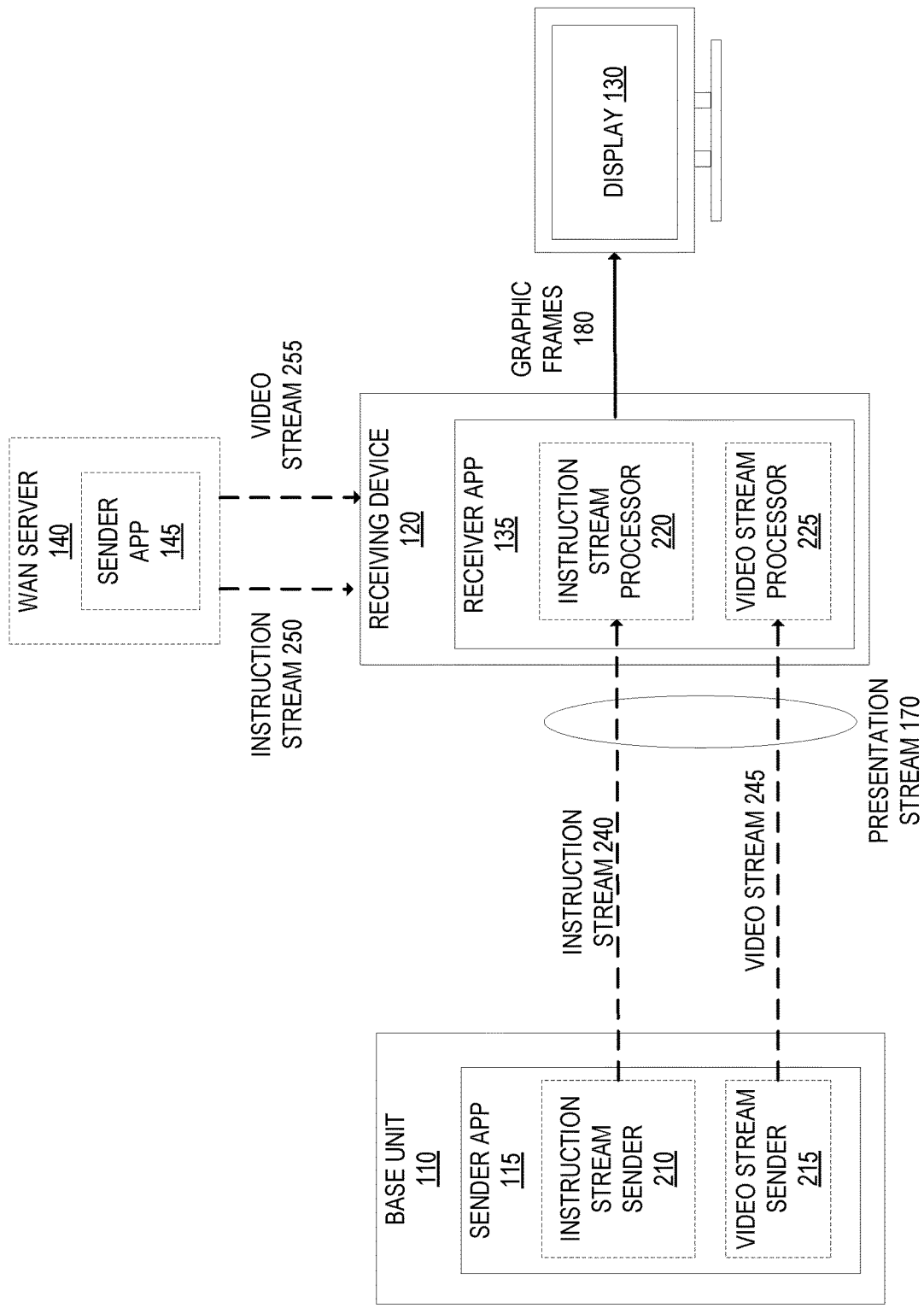
FIG. 2 shows an example of the distributed video and graphics rendering system according to an embodiment.

FIG. 2 shows an example of the distributed video and graphics rendering system according to an embodiment. As shown in FIG. 2, the sender application 115 of the base unit 110 includes the instruction stream sender 210 and the video stream sender 215, and the receiver application 135 of the receiving device 120 includes the instruction stream processor 220 and the video stream processor 225. The instruction stream sender 210 generates and transmits the instruction stream 240 to the receiving device 120 that is processed by the instruction stream processor 220 of the receiver application 135. The video stream sender 215 generates and transmits the video stream 245 that is processed by the video stream processor 225 of the receiver application 135. The sender application 145 of the WAN server 140 may include a similar instruction stream sender to generate and transmit the instruction stream 250 and/or a similar video stream sender to generate and transmit the video stream 255.

If sending an instruction stream to the receiving device 120, the instruction stream sender 210 does not perform render functions through a graphics engine and does not produce interpolated coordinates for animation. The instruction stream processor 220 of the receiver application 135 of the receiving device 120 instead performs the render functions and interpolation coordinates for animation. This reduces the compute load for the instruction stream sender 210 on the base unit 110. In an embodiment, the instruction stream 240 is transmitted through a protocol that enables a lossless, key frame-based interpolating remote rendering by the instruction stream processor 220.

In an embodiment, the instruction stream sender 210 is invisible to the main operating system of the base unit 110. For instance, a hypervisor with two different operating systems may be used on the base unit 110 with one operating system for the main operations of the base unit 110 and one operating system dedicated for driving the receiving device(s).

The instruction stream processor 220 receives and parses the instruction stream 240. The parsed instruction stream 240 includes drawing commands and their arguments. The instruction stream processor 220 executes the drawing commands and arguments to generate the graphic frames 180. The drawing commands map to rendering functions in a graphics engine of the instruction stream processor 220. In an embodiment, the instruction stream processor 220 produces interpolated coordinates for the rendering functions.

The video stream processor 225 receives and decodes the video stream 245. The decoded video stream 245 is represented by the graphic frames 180.

Figure 3:
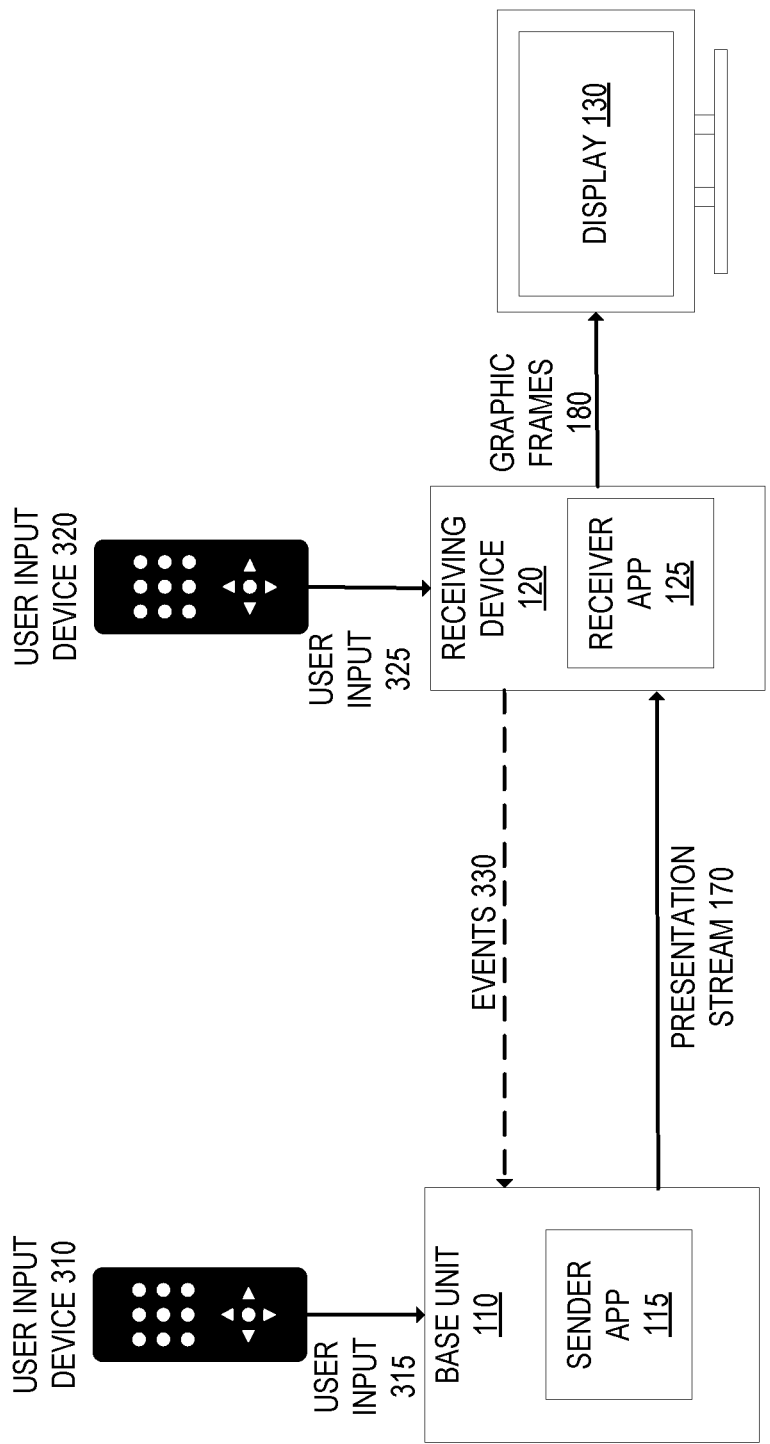
FIG. 3 shows an example of the distributed video and graphics rendering system that responds to event(s) according to an embodiment.

In an embodiment, the distributed video and graphics rendering system responds to event(s) received at the base unit and/or the receiving device. FIG. 3 shows an example of the distributed video and graphics rendering system that responds to event(s) according to an embodiment. The base unit 110 may be connected to the user input device 310 and receive the user input 315. The user input device 310 may be, for example, a controller, a keyboard, a mouse, an external camera, or other input device, that is either connected wirelessly (e.g., Bluetooth, Infrared, etc.) or wired to the base unit 110. Additionally, or alternatively, the base unit 110 may receive other user input 315 (e.g., voice input, gesture interpretation input, etc.). The user input 315 may inform or direct the output of what is currently rendering through the receiving device 120.

Additionally, or alternatively, the receiving device 120 may be connected to the user input device 320 and receive the user input 325. The user input device 320 may be, for example, a controller, a keyboard, a mouse, an external camera, or other input device, that is either connected wirelessly (e.g., Bluetooth, Infrared, etc.) or wired to the receiving device 120. Additionally, or alternatively, the receiving device 120 may receive other user input 325 (e.g., voice input, gesture interpretation input, etc.). If the receiving device 120 receives user input 325, in an embodiment, the receiving device 120 transmits the corresponding events 330 to the base unit 110 for further processing.

By way of example, if the input is audio input, a sound file may be recorded by the receiving device 120 and provided to the base unit 110. The base unit 110 may then process the audio input accordingly. As another example, if the input is video captured by the receiving device 120, a video file may be recorded by the receiving device 120 and provided to the base unit 110. The base unit 110 may then process the video and act accordingly. For instance, the base unit 110 may include the ability for a face sign-in and process the video to sign-in the user to the application if the user is recognized. The receiving device 120 may capture audio and transmit the audio to the base unit 110 for processing to allow for far-field voice control. The receiving device 120 may capture video and transmit the video to the base unit 110 for processing to allow video features such as face-sign in.

The base unit 110 processes the events (received from the receiving device 120 and/or received directly from the user input 315) to inform or direct the output of what is currently rendering on the receiving device 120. For instance, the event(s) are processed by the sender application 115 and their effect is reflected in the presentation stream 170. The events are specific to the application executing on the base unit 110 and/or the receiving device 120. For example, if the application executing on the base unit 110 is a media application (e.g., a television application, a streaming video application, etc.), the events are specific to that media application such as events for the user interface for the media application (e.g., navigation controls, media asset selection, etc.).

In an embodiment, a user input device 310 is permanently paired with the base unit 110. If the computer vision system of the base unit 110 sees the user input device 310 in its field of view, the base unit 110 considers the input events from the user input device 310 to be meant for the base unit 110 and processes the input events accordingly. If, however, the computer vision system of the base unit 110 does not see the user input device 310 in its field of view, the base unit 110 assumes that the user input device 310 is physically located near the receiving device 120 and considers the input events received from the user input device 310 to be meant for the receiving device 120 and processes the input events accordingly (e.g., the events are processed to drive the representation model of the receiving device 120).

Figure 4:
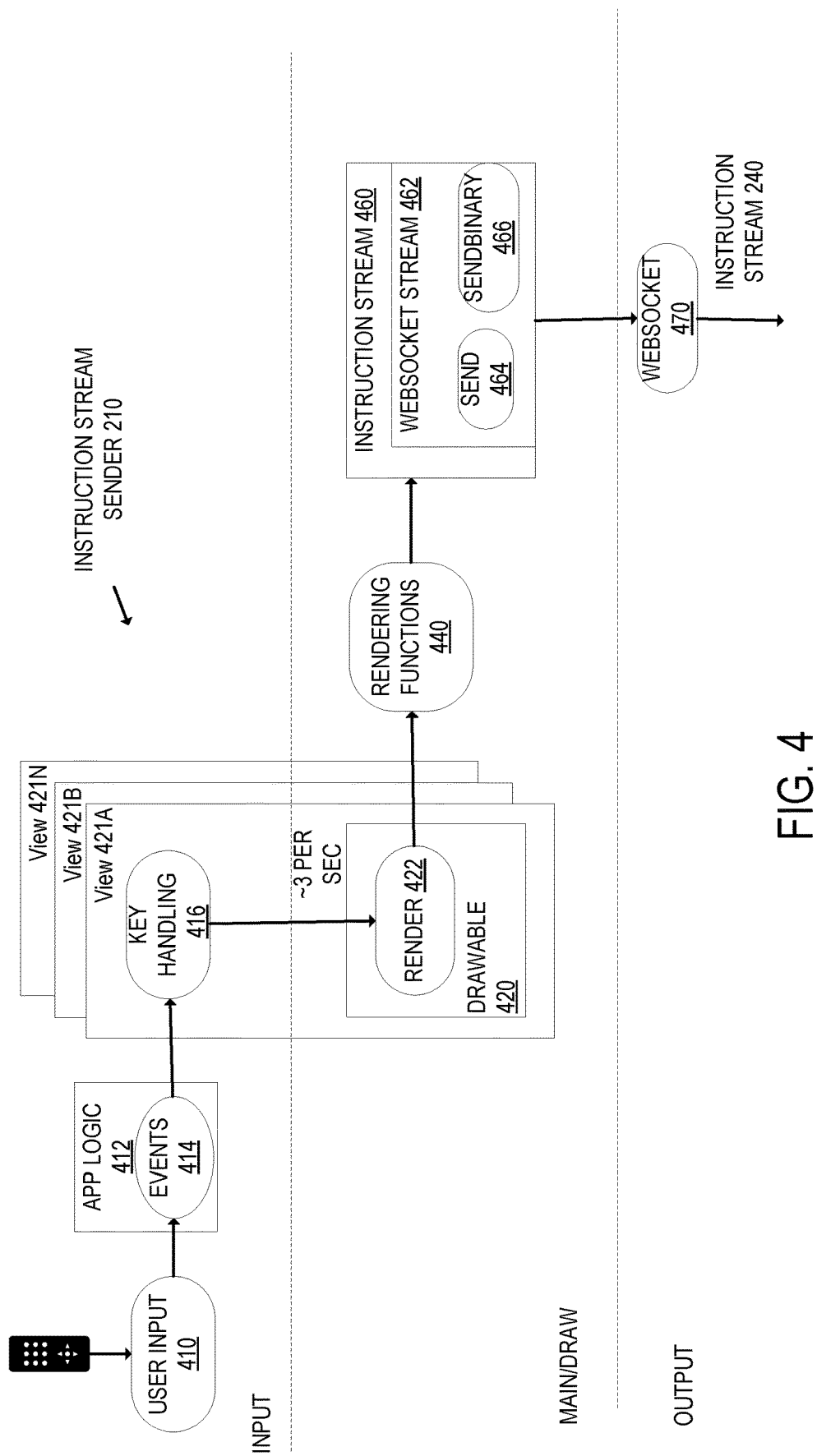
FIG. 4 illustrates an example of an architecture of the instruction stream sender of the base unit according to an embodiment.

FIG. 4 illustrates an example of an architecture of the instruction stream sender 210 according to an embodiment. The base unit 110 executes the instruction stream sender 210. The WAN server 140 may also execute a similar instruction stream sender. The instruction stream sender 210 is logically separated into an input piece, a main/draw piece, and an output piece. The input piece processes input such as user input 410. The user input 410 may be received from a user input device 310 or other user input (e.g., voice input, gesture interpretation input, etc.).

The application logic 412 processes the user input 410 to determine one or more events 414 corresponding to the user input 410. The events 414 may inform or direct the output on what is currently rendering on the receiving device 120. For instance, the events 414 may be for game controller input (button press, directional movement, etc.), navigational input (e.g., navigating a menu), power input, volume input, etc. The application logic 412 and the events 414 are specific to the application executing on the base unit 110 and/or the receiving device 120. For instance, if the application executing on the base unit 110 and/or the receiving device 120 is a media application (e.g., a television application, a streaming video application, etc.), the application logic 412 and the events 414 are specific to that media application such as the user interface for the media application and navigation controls for the user interface.

The events 414 are received by the UI views 421A-N. Each view 421 is a graphics plane. Multiple planes form the composite "window" or "overall view" presented to the user. The views 421A-N are individually positioned, animated, and ordered, and form a containment hierarchy. A key handling function 416 processes the event that may necessitate an update or re-rendering of the graphical user interface through a render function. A render function 422 is invoked from the drawable 420 to determine the position of graphics primitives. Since the interpolation will not be performed on the sender application if sending an instruction stream (the interpolation will be performed on the receiving application such as in the receiving device), relatively fewer renders are performed per second (e.g., 3 renders per second instead of 60 renders per second).

The render function 422 uses a number of rendering functions 440 to determine the position of graphics primitives. Because the graphics primitives are not being drawn by the instruction stream sender (they will be drawn by the receiver), the results of the rendering functions 440 are not processed by a graphics engine of the base unit 110 but instead are wrapped as commands by the instruction stream module 460 and sent in the instruction stream 240.

The rendering functions may include one or more of the following functions: a draw_cache function, a render_rect function, a clear function, a set_background function, an initialize function, a set_geometry function, a set_scroll_offset function, an animate function, a set_image function, a load_image function, a render_text function, a stroke_rect function, a frame_done function, and a destroy function.

The draw_cache function sets the size of the graphic plane. It may take as parameters a reference to a cache object, the location and dimensions in screen space (e.g., int x, y, w, h), and a Boolean that indicates whether the object is animatable.

The render_rect function renders a filled rectangle at a certain location and size using a given style. The parameters of the render_rect function may include the location and dimensions in screen space (e.g., int x, y, w, h), the string style, and a Boolean that indicates whether the object is animatable.

The clear function clears the graphics plane (e.g., to transparent black). It may take as parameters the location and dimensions in screen space (e.g., int x, y, w, h).

The set_background function sets the size of the graphics plane of the background. It takes as parameters a string that specifies the background such as a solid color, gradient, and particle system specifier.

The initialize function initializes a new graphics frame and communicates cache sizes to keep client and server understanding of least recently used (LRU) caches in sync. It takes as parameters a string version identifier that indicates the version of renderer requested, a Boolean that indicates whether the plane should be rendered exclusively, an integer of the size of the image cache, and an integer of the size of the text cache.

The set_geometry function sets the size of a graphics plane. It takes as parameters the location and dimensions in screen space (e.g., int x, y, w, h).

The set_scroll_offset function sets a new scroll offset of animatable objects in the last keyframe. It takes as parameters the location of new scroll offset informing animatable objects (e.g., int x, y).

The animate function triggers the animation of animatable objects in the current frame. The command designates the current frame as a keyframe. It takes as parameters the location of the current scroll offset anchoring animatable objects (e.g., int x, y), and a string specifying a timing function. The timing function quantifies acceleration and speed for three phases of an animation: acceleration, cruising, and deceleration.

The set_image function sets an image from a given binary blob and cache in a cache object for later recall by the draw_cache function. Its parameters include a reference to a cache object, the width and height of the image represented the image (e.g., int w, h), and a blob with the data of the image to set.

The load_image function loads an image from a given URL and cache in a cache object for later recall by the draw_cache function. Its parameters include a reference to a cache object, and a string URL of the image to load.

The render_text function renders a text string at a certain location and size using a given style. Its parameters may include the location and dimensions in screen space (e.g., int x, y, w, h), a string text, and a string style.

The stroke_rect function renders an outlined rectangle at a certain location and size using a given style. Its parameters include the location and dimensions in screen space (e.g., int x, y, w, h), a string style, and a Boolean that indicates whether the object is animatable.

The frame_done function declares the end of the instruction stream for the current frame. The frame_done function does not have any parameters.

The destroy function destroys/releases the graphics plane and all associated caches. The destroy function does not have any parameters.

As described above, the results of the rendering functions 440 are processed by the instruction stream module 460 and wrapped as commands. In an embodiment, the instruction stream 240 is sent using the WebSocket protocol using the WebSocket 470. In such an embodiment, the instruction stream module 460 includes a WebSocket stream module 462 that includes a send function 464 and a sendbinary function 466. The send function 464 is used to send at least some of the drawing commands as text strings. The sendbinary function 466 is used to send at least some of the drawing commands as binary.

Figure 5:
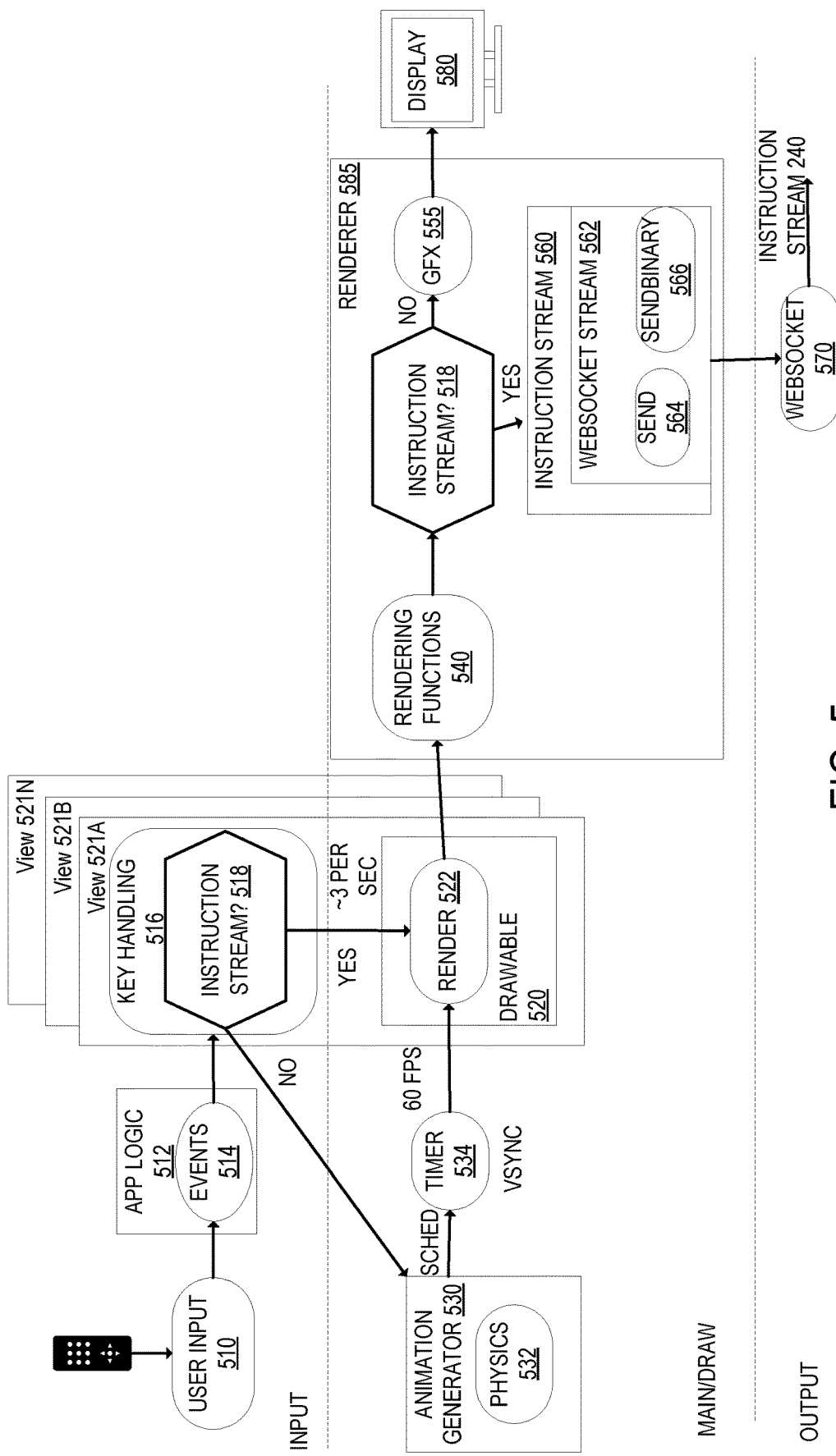
FIG. 5 illustrates an example of an architecture of a distributed video and graphic rendering system where the sender can operate in a dual mode including generating an instruction stream for a receiving device and perform direct rendering for output to a local connected display, according to an embodiment.

FIG. 5 illustrates an example of an architecture of a distributed video and graphic rendering system on the sender side (e.g., executing on the base unit 110). The architecture in FIG. 5 shows the ability to operate in a dual mode where the base unit 110 may generate an instruction stream for a receiving device and the base unit 110 may perform direct rendering for output to a local connected display depending in part on whether the output is the receiving device or the local connected display. The architecture shown in FIG. 5 may be used by the base unit 110. The instruction stream sender 210 is logically separated into an input piece, a main/draw piece, and an output piece. The input piece processes input such as user input 510. The user input 510 may be received from a user input device 310 or other user input (e.g., voice input, gesture interpretation input, etc.).

The application logic 512 processes the user input 510 to determine one or more events 514 corresponding to the user input 510. The events 514 may inform or direct the output on what is currently rendering on the receiving device 120. For instance, the events 514 may be for game controller input (button press, directional movement, etc.), navigational input (e.g., navigating a menu), power input, volume input, etc., similar to the events 414. The application logic 512 and the events 514 are specific to the application executing on the base unit 110 and/or the receiving device 120, like the application logic 412 and events 414.

The events 514 are received by the UI views 521A-N. Each view 521 is a graphics plane. Multiple planes form the composite "window" or "overall view" presented to the user. The views 521A-N are individually positioned, animated, and ordered, and form a containment hierarchy. A key handling function 516 processes the event that may necessitate an update or re-rendering of the graphical user interface through a render function including determining whether an instruction stream is to be generated 518 or direct rendering is performed. State on the object may be accessed to determine whether an instruction stream is generated. If an instruction stream is to be generated, then a render function 522 is invoked from the drawable 520. Since the interpolation will not be performed on the sender application if sending an instruction stream (the interpolation will be performed on the receiving application such as in the receiving device), relatively fewer renders are performed per second (e.g., 3 renders per second instead of 60 renders per second).

If an instruction stream is not to be generated (e.g., direct rendering is to be performed), then animations may be performed through a timer-driven physics module that invoke the render functions with interpolated drawing coordinates. Thus, if direct rendering is performed, an animation generator 530 using the physics module 532 is called to produce a number of in-between graphic commands at a predefined schedule using the timer 534 and provided to the render function 522 invoked from the drawable 520. For instance, 60 frames per second may be rendered.

The renderer 585 includes a number of rendering functions 540. If an instruction stream is to be generated, the results of the functions do not go to the graphics engine 555 but rather they are being wrapped as commands by the instruction stream module 560 and sent in the instruction stream 240. If an instruction stream is not to be generated (e.g., direct rendering is instead to be performed), the results of the rendering functions 540 are processed by the graphics engine 555 and output to the display 580. The rendering functions 540 may be the same as the rendering functions 440.

As described above, if the event is related to an instruction stream, the results of the rendering functions 540 are processed by the instruction stream module 560 and wrapped as commands. In an embodiment, the instruction stream 240 is sent using the WebSocket protocol using the WebSocket 570. In such an embodiment, the instruction stream module 560 includes a WebSocket stream module 562 that includes a send function 564 and a sendbinary function 566. The send function 564 is used to send at least some of the drawing commands as text strings. The sendbinary function 566 is used to send at least some of the drawing commands as binary.

Figure 6:
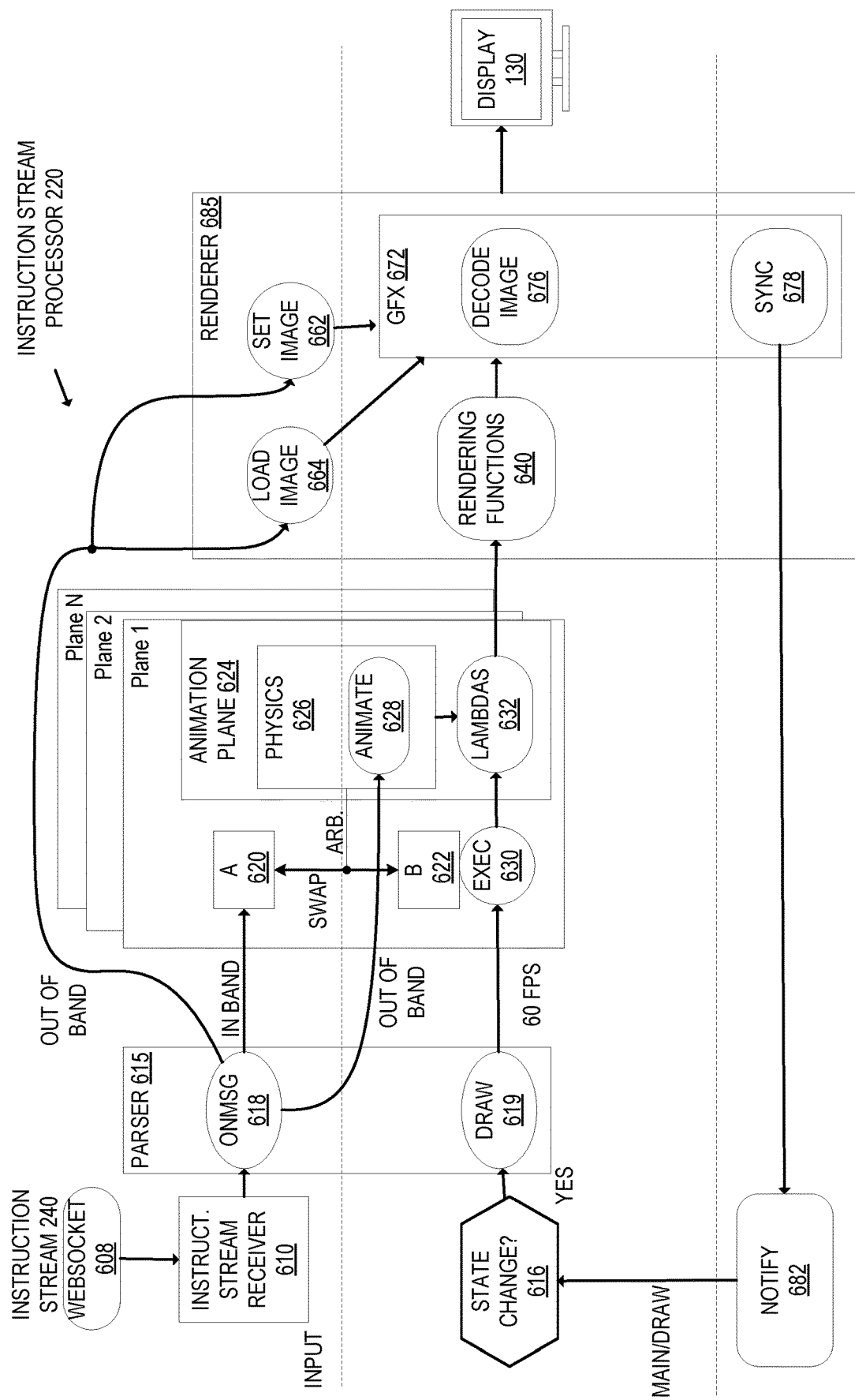
FIG. 6 illustrates an example architecture of the instruction stream processor of the receiving device according to an embodiment.

FIG. 6 illustrates an example architecture of the instruction stream processor 220 according to an embodiment. The receiving device 120 executes the instruction stream processor 220. The instruction stream processor 220 is logically separated into an input piece, a main/draw piece, and a sync piece. The input piece processes input such as coming from the instruction stream 240 through the WebSocket 608 received at the instruction stream receiver 610.

The instruction stream processor 220 parses the instruction stream 240 to determine the commands and their arguments included in the instruction stream 240. The parser 615 performs on each message 618 that is received. Each plane, which is a graphics view, has a receive buffer A 620 and an execution buffer B 622. The parser 615 parses the instruction stream 240 and writes the commands and arguments into the receive buffer A 620. When the end of a frame is received (e.g., the frame done command is received), the definition of the plane is complete and the receive buffer A 620 is swapped with the execution buffer B 622, which is arbitrated by the physics module 626. Then, or periodically with the refresh cycle of the display, a draw function 619 is triggered which executes 630 the commands of the execution buffer B 622. Most of these commands are directly mapped to the rendering functions 640 in the graphics engine 672. Some of the commands that are changing state or calling functions other than in the renderer 685 are not mapped to the rendering functions 640, such as the frame done command and the set scroll offset command are consumed by the current graphics plane.

Some of the commands can be processed out-of-band; instead of being written into the receive buffer A 620 for deferred execution, they can be processed immediately. Such commands may include the animate command for animating graphics on the graphics plane, the load image command for loading images from URLs into low-level graphics representations such as textures, and the set image command for setting image data into textures.

The animate command 628 of the animation plane 624 triggers the physics module 626 which injects itself between command execution 630 and rendering functions 640 and produces interpolated coordinates (using the lambdas 632) for the rendering functions 640 for the duration of the animation as specified in the animate command, while following the timing function specified in the animate command. The use of the lambdas 632 (e.g., dx/dy) modulates the coordinates in the execution buffer B 622 to the rendering functions 640 (which work with absolute coordinates) to instruct the renderer 685 what to draw and where. The animate command effectively synthesizes animations in the renderer 685 that would otherwise have been performed on the base unit 110. While active, the physics module 626 prevents the swapping of the receive buffer A 620 and the execution buffer B 622 if there is currently an animation being processed. However, this arbitration is relaxed if a new animate command arrives out of band, which may cause the internal animation state to be prolonged for the combined durations of the current and incoming animation and a new buffer to be swapped in while the animation is active. In such a case, the timing functions of both current and old animations may also be merged to form a new single, uninterrupted animation.

The renderer 685 is used to generate the graphic frames for display on the display 130. The renderer 685 includes a set image function 662 and a load image function 664, the rendering functions 640, and a graphics engine 672. The renderer 685 may be implemented over native graphics, threading, and decode APIs. The graphics engine 672 includes, among other items, a decode image function 676. The decode image function 676 is called by the load image function 664 and produces a texture from data formatted according to an image format. The graphics engine 672 includes the sync function 678 (e.g., vsync) that calls a notify function 682 to signal the main/draw piece to check if there has been a state change 616 that requires a graphics plane to be redrawn (e.g., an unrendered frame or a frame that needs to be re-rendered). If there is, then the draw function 619 is triggered which executes 630 the commands of the execution buffer B 622.

In an embodiment, the receiving device 120 performs a prolong function that extends animations to produce a smooth animation that looks continuous if an animate command is received while another animation is currently being performed and the new animation is in the same direction as the animation currently being performed. The prolong function merges the timing function of the next animation (specified in the most recently received animate command) with the timing function of the of the current animation (specified in the animate command that is currently being processed). The timing function quantifies acceleration and speed for three phases of an animation: acceleration, cruising, and deceleration. The merging effectively extends the envelope of the animation and provides for seamless animation execution. If the current animation is in the cruising phase, the merged animation continues to cruise (skipping the declaration and acceleration phases of the current and next animation). If the cruising speeds of the current animation and the next animation are different, the cruising speed is adjusted following the acceleration profile of the next animation if the next animation's speed is higher, or following the deceleration profile of the current animation if the next animation's speed is lower. If the current animation is in the acceleration phase, the cruising phases are chained together as described above. If the current animation is in the deceleration phase, the merged animation accelerates back to cruising speed following the next animation's respective acceleration and cruising speed profiles. Any number of prolongs can be performed, effectively allowing an indefinite animation (one without a predefined end).

Figure 7:
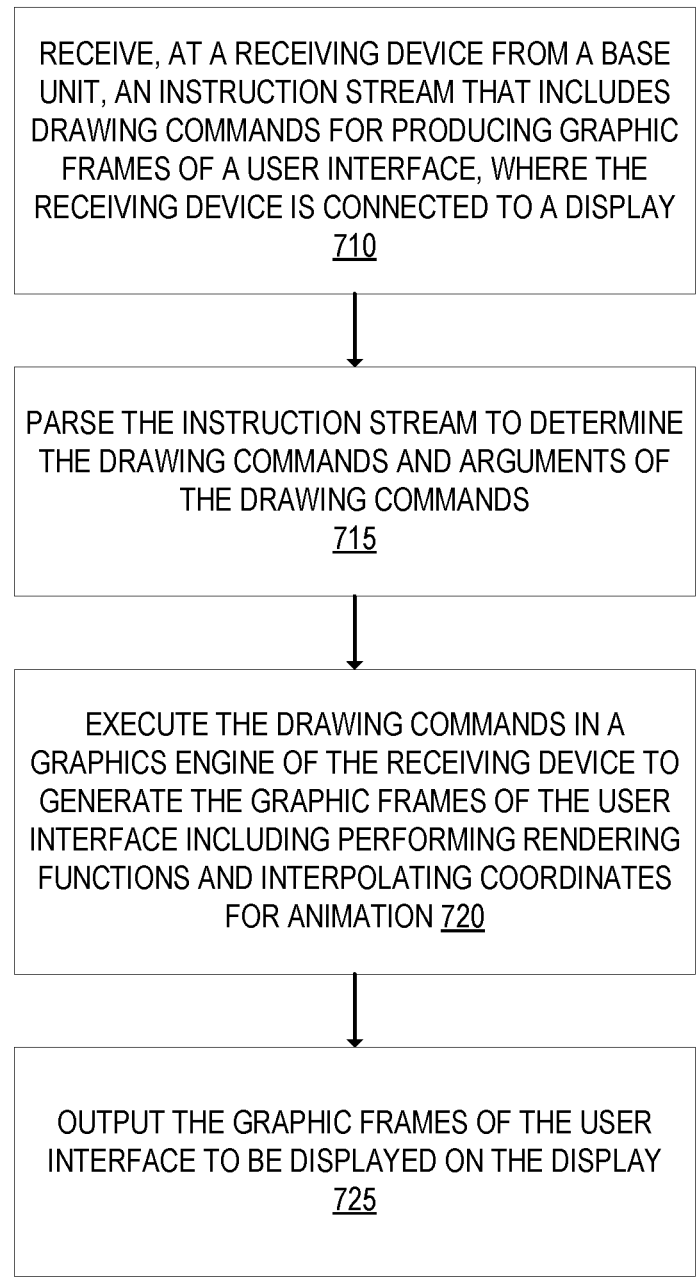
FIG. 7 is a flow diagram that illustrates exemplary operations of the distributed video and graphics rendering system according to an embodiment.

FIG. 7 is a flow diagram that illustrates exemplary operations of the distributed video and graphics rendering system according to an embodiment. At operation 710, the receiving device 120 receives from the base unit 110, an instruction stream that includes drawing commands for producing graphic frames of a user interface. The receiving device 120 is connected to the display 130. The user interface may be for a media application such as a television application, streaming video application, video-on-demand application, gaming application, music application, photo application; a social networking application; a smart home or smart office application; or any other application that uses a user interface. The instruction stream is received across a network that may be a wireless network such as Wi-Fi or Bluetooth, or over a wired network such as Ethernet. The instruction stream may be received at the receiving device 120 using the WebSocket protocol or other low-level network protocols. At least some of the drawing commands may be received as text strings. Some drawing commands may be received as binary packets. The instruction stream may be lossless. That is, the original data representing the user interface is able to be perfectly reconstructed by the receiving device 120 using the information in the instruction stream.

Next, at operation 715, the receiving device 120 parses the instruction stream to determine the drawing commands and arguments of the drawing commands. In an embodiment, the receiving device 120 writes the parsed commands and their arguments into a receive buffer.

By way of example, the drawing commands may include one or more of the following:

a draw cache command to set the size of the graphic plane with arguments that include a reference to a cache object, the location and dimensions of the graphic plane in screen space (e.g., values for int x, y, w, h), and a Boolean that indicates whether the object is animatable (this command corresponds with the draw_cache function previously described);

a render rectangle command to render a filled rectangle at a certain location and size using a given style, with arguments indicating the location and dimensions of the filled rectangle in screen space (e.g., values for int x, y, w, h), the string style, and a Boolean that indicates whether the object is animatable (this command corresponds with the render_rect function previously described);

a clear command to clear the graphics plane (e.g., to transparent black), with arguments indicating the location and dimensions in screen space where to clear (e.g., int x, y, w, h) (this command corresponds with the clear function previously described);

a set background command to set the size of the graphics plane of the background, with arguments specifying the background such as a solid color, gradient, and particle system specifier (this command corresponds with the set_background function previously described);

an initialize command to initialize a new graphics frame communicate cache sizes to keep the understanding of the LRU caches of the receiving device 120 and the base unit 110 in sync, with arguments including a string version identifier that indicates the version of renderer requested, a Boolean that indicates whether the plane should be rendered exclusively, an integer of the size of the image cache, and an integer of the size of the text cache (this command corresponds to the initialize function);

a set geometry command to set the size of a graphics plane, with arguments including the location and dimensions in screen space (e.g., values for int x, y, w, h) (this command corresponds with the set_geometry function previously described);

a set scroll offset command to set a new scroll offset of animatable objects in the last keyframe, with arguments including the location of the new scroll offset information animatable objects (e.g., values for int x, y) (this command corresponds with the set_scroll_offset function previously described);

an animate command to trigger the animation of animatable objects in the current frame, with arguments including the location of the current scroll offset anchoring animatable objects (e.g., values for int x, y), and a string specifying a timing function (this command corresponds with the animate function previously described);

a set image command to set an image from a given binary blob and cache in a cache object for later recall by the draw_cache function, with arguments including a reference to a cache object, the width and height of the image represented the image (e.g., values for int w, h), and a blob with the data of the image to set (this command corresponds with the set_image function previously described);

a load image command to load an image from a given URL and cache in a cache object for later recall by the draw_cache function, with arguments including a reference to a cache object, and a string URL of the image to load (this command corresponds to the load_image function previously described);

a render text command to render a text string at a certain location and size using a given style, with arguments including the location and dimensions in screen space of the text (e.g., int x, y, w, h), a string text, and a string style (this command corresponds to the render_text function previously described);

a render outlined rectangle command to render an outlined rectangle at a certain location and size using a given style, with arguments including the location and dimensions in screen space (e.g., values for int x, y, w, h), a string style, and a Boolean that indicates whether the object is animatable (this command corresponds to the stroke_rect function previously described);

a frame done command to declare the end of the instruction stream for the current frame (this command may not have any arguments, and corresponds to the frame_done function previously described); and a destroy command to destroy/release the graphics plane and all associated caches (this command may not have arguments and corresponds to the destroy function previously described).

Next, at operation 720, the receiving device 120 executes the drawing commands in a graphics engine of the receiving device 120 to generate the graphic frames of the user interface including performing rendering functions and interpolating coordinates for animation. In an embodiment, executing includes swapping commands and arguments in the receive buffer to an execution buffer when the end of the frame is received (the frame_done command), and then, or periodically with the refresh cycle of the display 130, a draw function is triggered that executes the commands in the execution buffer. These commands are directly mapped to rendering functions in the graphics engine that produce graphic frames for output to the display 130. Alternatively, or additionally, executing the drawing commands includes executing an animate command that triggers a physics module that injects itself between command execution and rendering functions to produce interpolated coordinates for the rendering functions for the duration of the animation as specified in the animation command while following the timing function specified in the animation command. Executing the animation command on the receiving device 120 synthesizes animation on the receiving device 120 instead of the base unit 110 performing the animation. The receiving device 120 may use native graphics, threading, and decode APIs for the execution of the drawing commands.

Next, at operation 725, the receiving device 120 outputs the graphic frames of the user interface to be displayed on the display 130. The graphic frames may be outputted over an HDMI connection or other video connection connecting the receiving device 120 and the display 130.

Figure 8:
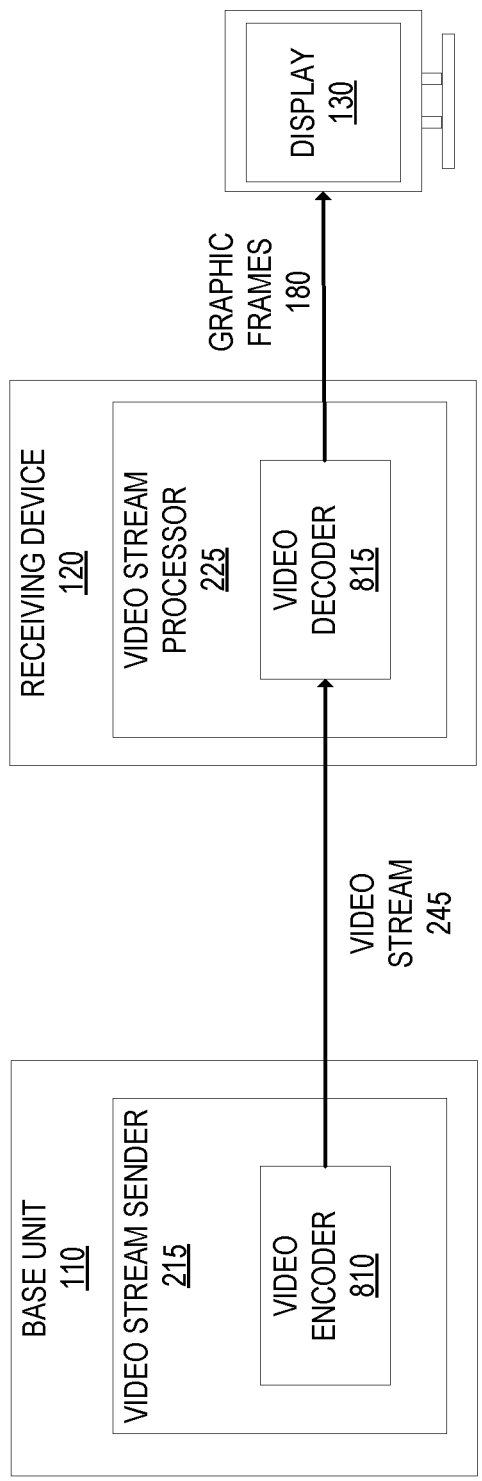
FIG. 8 shows an example of the distributed video and graphics rendering system where a video stream is communicated from a sender to a receiver according to an embodiment.

FIG. 7 illustrates operations performed at the receiving device 120 when receiving and processing an instruction stream. Instead of, or in addition to receiving and processing an instruction stream, the receiving device 120 may receive and process a video stream. FIG. 8 shows an example of the distributed video and graphics rendering system where a video stream is communicated from a sender to a receiver according to an embodiment. The video stream sender 215 of the base unit 110 includes a video encoder 810. The video stream processor 225 of the receiving device 120 includes a video decoder 815. The video encoder 810 encodes the video stream 245, which may be in a standard video format such as H.264, H.265, AV1, VP9, etc. The video stream sender 215 transmits the video stream 245 to the receiving device 120. The transmission may use RTP, RTMP, or other protocol. The video stream processor 225 receives the video stream 245 and uses the video decoder 815 to decode the encoded video. The decoded video is outputted as graphic frames to the display 130. Although FIG. 8 illustrates the receiving device 120 receiving a video stream from the base unit 110, the receiving device 120 may receive, alternatively or additionally, a video stream from a remote server such as the WAN server 140. The WAN server 140 may include a similar video encoder or may transmit an already encoded video. Although FIG. 8 illustrates the base unit 110 encoding the video stream, in some cases the base unit 110 transmits an already encoded video file to the receiving device 120 without the need to encode the video.

Figure 9:
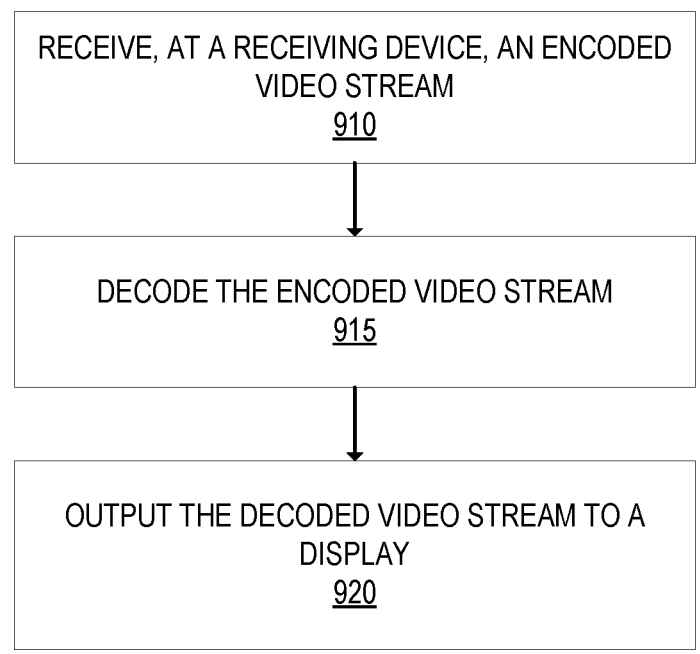
FIG. 9 is a flow diagram that illustrates exemplary operations for receiving and processing a video stream according to an embodiment.

FIG. 9 is a flow diagram that illustrates exemplary operations for receiving and processing a video stream according to an embodiment. At operation 910, the receiving device 120 receives an encoded video stream. The encoded video stream may be received from the base unit 110 or from the remote WAN server 140. The encoded video stream may be encoded in a standard video format such as H.264, H.265, AV1, VP9, etc., and transmitted using RTP, RTMP, or other protocol. Next, at operation 915, the receiving device 120 decodes the encoded video stream. Next, at operation 920, the receiving device 120 outputs the decoded video stream to the display 130.

Figure 10:
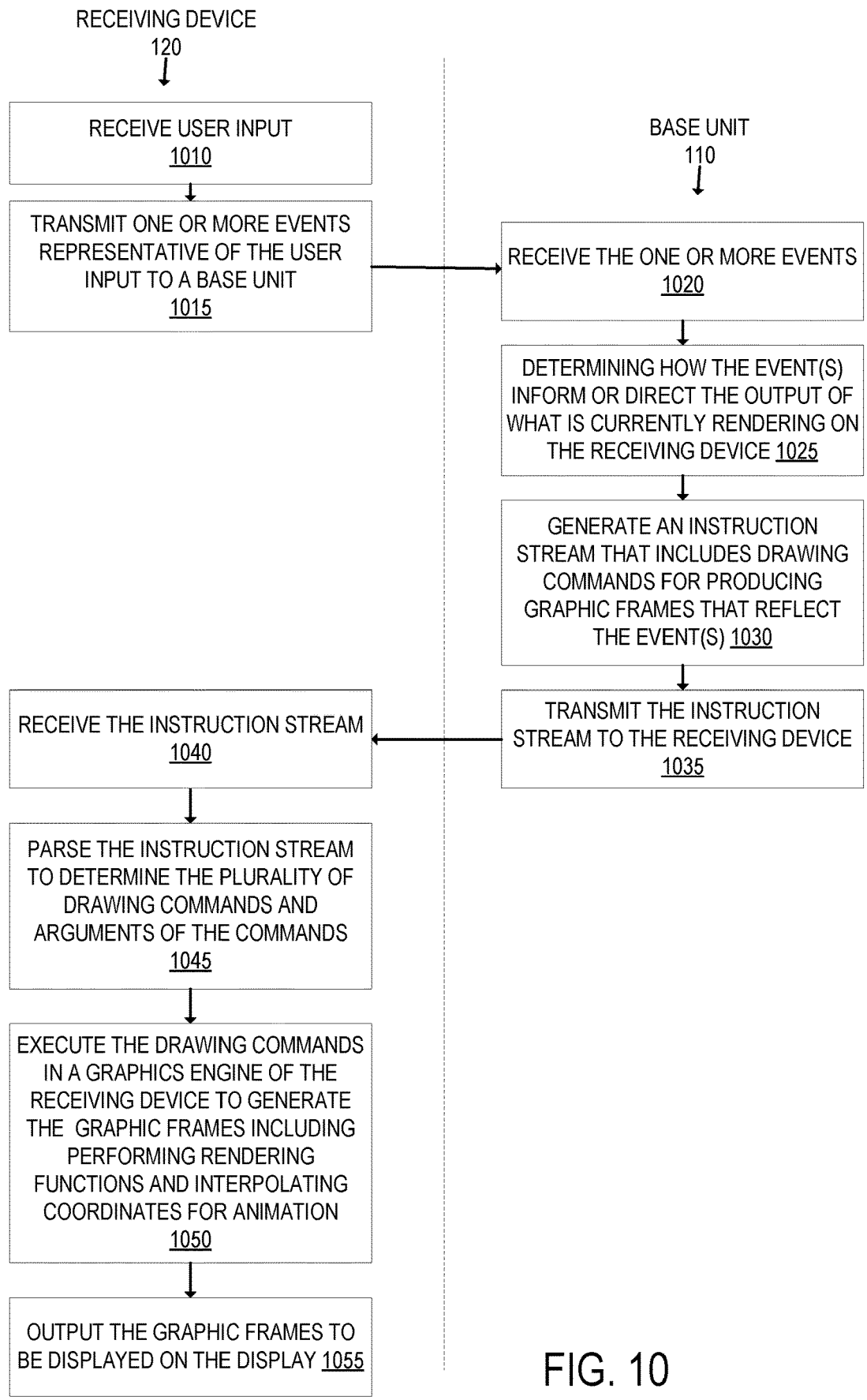
FIG. 10 is a flow diagram that illustrates exemplary operations for a distributed video and graphics rendering system that is driven by user input events received at a receiving device, according to an embodiment.

As previously described, the distributed video and graphics rendering system may be driven by user input events. FIG. 10 is a flow diagram that illustrates exemplary operations for a distributed video and graphics rendering system that is driven by user input events received at a receiving device, according to an embodiment.

At operation 1010, the receiving device 120 receives user input. The user input may be received from a user input device 320 connected with the receiving device 120. Alternatively, or additionally, the user input may be received through voice input and/or gesture interpretation. Exemplary user inputs include navigational input (e.g., navigating a menu displayed through the receiving device 120 on the display 130), media asset selection, game controller input (button press, directional movement, etc.), etc.

Next, at operation 1015, the receiving device 120 transmits one or more events representative of the user input to the base unit 110, and the base unit 110 receives the one or more events from the receiving device 120 at operation

1020. Although FIG. 10 illustrates the base unit 110 receiving event(s) from the receiving device 120, alternatively or additionally, the base unit 110 receives event(s) from user input at the base unit 110 (e.g., from the user input device 310 or through other user input such as voice input or gesture input received at the base unit 110).

Next, at operation 1025, the base unit 110 determines how the one or more events to inform or direct the output of what is currently rendering on the receiving device 120. For instance, the base unit 110 determines how to instruct the receiving device 120 regarding changes/updates to what is being displayed through the receiving device 120. The events are specific to the application executing on the receiving device 120. For instance, if the application is a media application and the event is scrolling through a listing of media assets that can be played through the media application, the base unit 110 determines what should be shown on the media application as a result of the scrolling.

Next, at operation 1030, the base unit 110 generates an instruction stream that includes drawing commands for producing graphic frames that reflect the one or more events. When generating this instruction stream, the base unit 110 does not perform rendering functions in a graphics engine and does not produce interpolated coordinates for animation. Instead, the rendering functions and any interpolated coordinates for animation will be performed at the receiving device 120. The base unit 110 executes one or more functions to produce one or more commands included in the instruction stream to be executed by the receiving device 120 to reflect the one or more events. The one or more functions (described previously) may include one or more of: a draw_cache function, a render_rect function, a clear function, a begin_frame instruction, a set_background function, an initialize function, a set_geometry function, a set_scroll_offset function, an animate function, a set_image function, a load_image function, a render_text function, a stroke_rect function, a frame_done function, and a destroy function. The commands may be configured to be sent as text strings and/or binary commands.

Next, at operation 1035, the base unit 110 transmits the instruction stream to the receiving device 120. The instruction stream may be lossless. That is, the original data representing the changes to the user interface is able to be perfectly reconstructed by the receiving device 120 using the information in the instruction stream. The instruction stream may be sent using the WebSocket protocol. The receiving device 120 receives the instruction stream at operation 1040.

Although not illustrated in FIG. 10, the base unit 110 may include at least two operating systems, where one operating system performs the processing of the event and generation of the instruction stream to drive the receiving device 120 and the other operating system performs tasks unrelated to processing events and user interface commands for the receiving device 120. For instance, the other operating system may be the main operating system of the base unit 110. The separation of the operating systems may be done through use of a hypervisor. In another embodiment, the sender application 115 on the base unit 110 runs invisibly as a service in the operating system of the base unit 110 or in a virtualized headless operating system.

At operation 1040, the receiving device 120 receives the instruction stream from the base unit 110 that includes drawing commands for producing graphic frames of the user interface to reflect the user input. Next, at operation 1045, the receiving device 120 parses the instruction stream to determine the drawing commands and arguments of the drawing commands. The operation 1045 is similar to the operation 715 previously described including examples of the drawing commands that may be included in the instruction stream. Next, at operation 1050, the receiving device 120 executes the drawing commands in a graphics engine of the receiving device 120 to generate the graphic frames of the user interface including performing rendering functions and interpolating coordinates for animation. The operation 1050 is similar to the operation 720 previously described. Next, at operation 1055, the receiving device 120 outputs the graphic frames to be displayed on the display 130. The operation 1055 is similar to the operation 725 previously described.

In an embodiment, the receiving device 120 may receive at least two concurrent streams. For instance, the receiving device may receive two instruction streams concurrently, one instruction stream and one video stream concurrently, and/or two video streams concurrently. The receiving device may output each of the concurrent streams to the same display at the same time. For instance, the receiving device may blend the concurrent streams or show them side-by-side or picture-in-picture. For instance, a video stream may be received and an instruction stream for a navigation UI may be overlaid by the receiving device. As another example, a video stream representing a game may be received and displayed and a video stream of another video may be shown as a picture-in-picture. As another example, an instruction stream for a user interface may be received and shown side-by-side with a video of a video stream received from a remote server.

Figure 11:
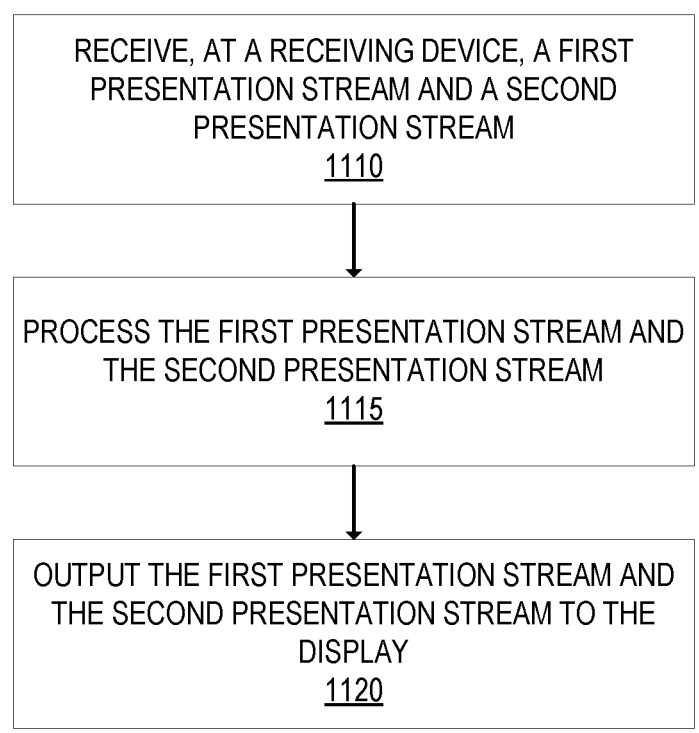
FIG. 11 is a flow diagram that illustrates exemplary operations for the receiving device receiving and processing two concurrent streams, according to an embodiment.

FIG. 11 is a flow diagram that illustrates exemplary operations for the receiving device receiving and processing two concurrent streams, according to an embodiment. At operation 1110, the receiving device 120 receives a first presentation stream and a second presentation stream. The first presentation stream and the second presentation stream may both be an instruction stream, may both be a video stream, or may be one instruction stream and one video stream. The first presentation stream and the second presentation stream may both be received from the base unit 110, received from the WAN server 140, or one may be received from the base unit 110 and the other received from the WAN server 140.

Next, at operation 1115, the receiving device 120 processes the first presentation stream and the second presentation stream. The receiving device 120 processes each of the presentation streams differently depending on whether it is a video stream or an instruction stream. For instance, if a presentation stream is an instruction stream, the receiving device 120 parses the instruction stream to determine the drawing commands and arguments and executes those commands to produce the graphic frames as previously described herein. If a presentation is a video stream, the receiving device 120 decodes the video stream and outputs the decoded video as previously described herein.

Next, at operation 1120, the receiving device 120 outputs the first presentation stream and the second presentation stream to the display 130. The receiving device 120 may blend the concurrent streams or show them side-by-side or picture-in-picture. For instance, a video stream may be received and an instruction stream for a navigation UI may be overlaid by the receiving device 120 to be displayed on the display 130. As another example, a video stream representing a game may be received and displayed and a video stream of another video may be shown as a picture-in-picture. As another example, an instruction stream for a user interface may be received and shown side-by-side with a video of a video stream received from a remote server.

Although the receiving device has been described with connecting to an external display for display, embodiments described herein apply if the receiving device has its own internal display. That is, instead of outputting the graphic frames to be displayed by an external display, the graphic frames may be displayed on the receiving device itself if it has its own internal display.

Figure 12:
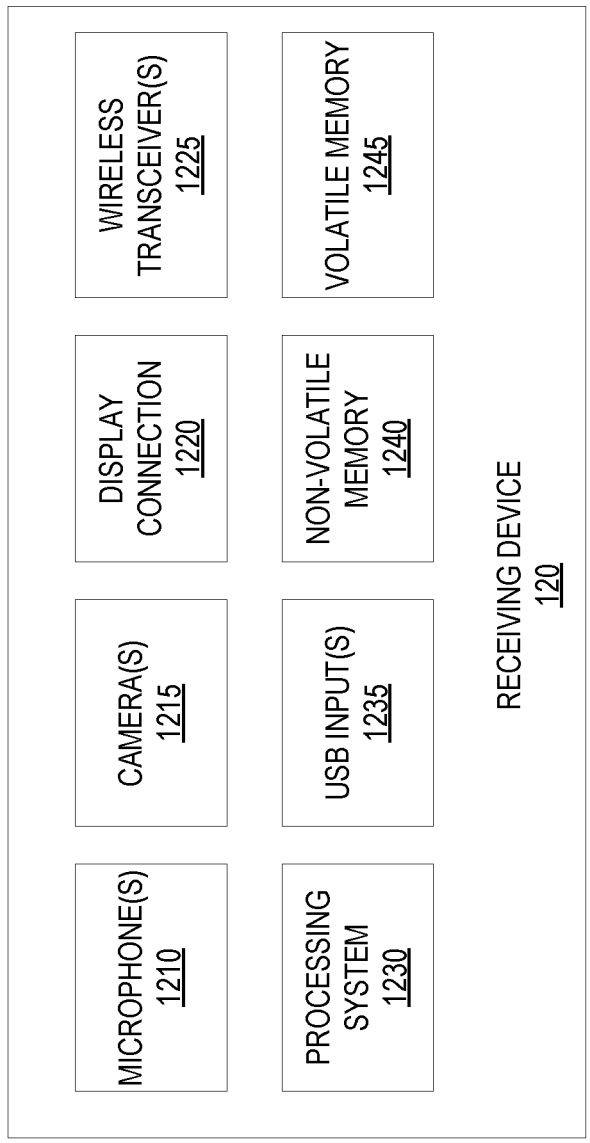
FIG. 12 is a block diagram that shows an exemplary architecture of the receiving device according to an embodiment.

FIG. 12 is a block diagram that shows an exemplary architecture of the receiving device 120 according to an embodiment. The receiving device 120 includes one or microphones 1210 for voice processing, one or more cameras 1215 for image processing, a display connection 1220 (e.g., HDMI connection, DisplayPort connection, etc.), one or more wireless transceivers 1225 (e.g., a Bluetooth transceiver, a Wi-Fi transceiver, etc.), a processing system 1230, one or more USB inputs 1235, non-volatile memory 1240 (e.g., a hard drive, flash memory, phase-change memory (PCM), etc.), and volatile memory 1245 (e.g., random-access memory (RAM), dynamic RAM (DRAM), static RAM (SRAM)). The processing system 1230 includes a central processing unit (CPU) and a graphics processing unit (GPU) (either an integrated graphics unit or a separate GPU). The processing system 1230 may retrieve instruction(s) from the volatile memory 1245 and/or the non-volatile memory 1240 and execute the instructions to perform operations described herein, including executing the commands to produce the graphic frames describe herein. The components of FIG. 12 may be coupled together with one or more buses. One or more of these components may be optional. For instance, in some embodiments, the receiving device does not include microphone(s) and/or camera(s). Further, the receiving device 120 may include additional components. For instance, in an embodiment, the receiving device 120 may include a wired transceiver for wired communication (e.g., an Ethernet transceiver). The receiving device 120 may be implemented on a SoC.

FIG. 13 is a block diagram that shows an exemplary architecture of the base unit 110 according to an embodiment. The base unit 110 includes one or more microphones 1310 for voice processing, one or more cameras 1315 for image processing, a display connection 1320 (e.g., HDMI connection, DisplayPort connection, etc.), one or more wireless transceivers 1325 (e.g., a Bluetooth transceiver, a Wi-Fi transceiver, etc.), a processing system 1330, one or more USB inputs 1335, non-volatile memory 1340 (e.g., a hard drive, flash memory, phase-change memory (PCM), etc.), and volatile memory 1345 (e.g., random-access memory (RAM), dynamic RAM (DRAM), static RAM (SRAM)). The processing system 1330 includes a central processing unit (CPU) and a graphics processing unit (GPU) (either an integrated graphics unit or a separate GPU). The processing system 1330 may retrieve instruction(s) from the volatile memory 1345 and/or the non-volatile memory 1340 and execute the instructions to perform operations described herein, including receiving events and generating a presentation stream as part of the distributed video and graphics rendering system described herein. The components of FIG. 13 may be coupled together with one or more buses. One or more of these components may be optional. For instance, in some embodiments, the base unit 110 does not include microphone(s) and/or camera(s). Further, the base unit 110 may include additional components. For instance, in an embodiment, the base unit 110 may include a wired transceiver for wired communication (e.g., an Ethernet transceiver). When compared to the receiving device 120, the base unit 110 is relatively more powerful (e.g., a more powerful processing system, larger and faster volatile memory and/or non-volatile memory).

The techniques shown in the figures can be implemented using code and data stored and executed on one or more computing devices (e.g., base unit, receiving device, WAN server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment may be implemented using different combinations of software, firmware, and/or hardware.

The operations in the flow diagrams was were described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

While the flow diagrams in the figures show a particular order of operations performed by certain embodiments, such order is exemplary (e.g., alternative embodiments may perform the operations in a different order, combine certain operations, overlap certain operations, etc.).

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the preceding description.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a receiving device from a base unit and from across a network, a first part of an instruction stream that includes a first plurality of drawing commands for producing a first plurality of graphic frames of a user interface, wherein the receiving device is connected to a display;
parsing the received first part of the instruction stream to determine the first plurality of drawing commands and arguments of the first plurality of drawing commands;
writing a subset of the first plurality of drawing commands and arguments of the subset of the first plurality of drawing commands into a receiver buffer;
when there is an animation command being executed, preventing swapping the subset of the first plurality of drawing commands and the arguments of the subset of the first plurality of drawing commands from the receiver buffer to an execution buffer;
when no animation command is being executed, swapping the subset of the first plurality of drawing commands and the arguments of the subset of the first plurality of drawing commands from the receiver buffer to an execution buffer;
executing the first plurality of drawing commands in a graphics engine of the receiving device to generate the first plurality of graphic frames of the user interface, the executing including performing rendering functions and interpolating coordinates for animation, wherein the executing includes executing the subset of the first plurality of drawings commands of the execution buffer; and
outputting the first plurality of graphic frames of the user interface to be displayed on the display.

2. The method of claim 1, further comprising:
receiving, at the receiving device, user input;
transmitting one or more events representative of the user input to the base unit;
receiving, from the base unit, a second part of the instruction stream that includes a second plurality of drawing commands for producing a second plurality of graphics frames that reflect a result of the received user input;
parsing the received second part of the instruction stream to determine the second plurality of drawing commands and arguments of the second plurality of drawing commands;
executing the second plurality of drawing commands in the graphics engine to generate the second plurality of graphics frames; and
outputting the second plurality of graphics frames to be displayed on the display.

3. The method of claim 1, further comprising:
receiving, at the receiving device from the base unit and from across the network, an encoded video stream;
decoding the encoded video stream; and
outputting the decoded video stream to be displayed on the display.

4. The method of claim 1, wherein the instruction stream is lossless.

5. The method of claim 1, further comprising:
receiving, at the receiving device from a remote server, an encoded video stream;
decoding the encoded video stream; and
outputting the decoded video stream to be displayed on the display.

6. The method of claim 5, wherein outputting the first plurality of graphic frames of the user interface to be displayed on the display and outputting the decoded video stream to be displayed on the display occurs concurrently.

7. A method, comprising:
receiving, at a base unit that includes a first operating system and a second operating system that are separate from one another, one or more events related to a receiving device that is communicatively coupled with the base unit over a network, wherein the first operating system is dedicated for driving the receiving device and the second operating system is dedicated to operations of the base unit and performs tasks unrelated to processing events and user interface commands for the receiving device;
determining how the one or more events inform or direct an output of what is currently rendering on the receiving device;
generating, by the first operating system, an instruction stream that includes a plurality of drawing commands for producing a plurality of graphic frames of a user interface for the receiving device that correspond with the one or more events, wherein generating the instruction stream does not include performing rendering functions in a graphics engine and producing interpolated coordinates for animation; and
transmitting, over the network, the generated instruction stream to the receiving device.

8. The method of claim 7, further comprising:
encoding a video stream to produce an encoded video stream; and
transmitting the encoded video stream to the receiving device.

9. The method of claim 7, wherein the instruction stream is lossless.

10. The method of claim 7, wherein the one or more events are received from user input at the receiving device.

11. The method of claim 7, wherein the one or more events are received from user input at the base unit.

12. A non-transitory machine-readable storage medium that provides instructions that, when executed by a processor of a receiving device, cause said processor to perform operations comprising:
receive, at the receiving device from a base unit and from across a network, a first part of an instruction stream that includes a first plurality of drawing commands for producing a first plurality of graphic frames of a user interface, wherein the receiving device is to be connected to a display;
parse the received first part of the instruction stream to determine the first plurality of drawing commands and arguments of the first plurality of drawing commands;
write a subset of the first plurality of drawing commands and arguments of the subset of the first plurality of drawing commands into a receiver buffer;
when there is an animation command being executed, prevent swapping the subset of the first plurality of drawing commands and the arguments of the subset of the first plurality of drawing commands from the receiver buffer to an execution buffer;
when no animation command is being executed, swap the subset of the first plurality of drawing commands and the arguments of the subset of the first plurality of drawing commands from the receiver buffer to an execution buffer;
execute the first plurality of drawing commands in a graphics engine of the receiving device to generate the first plurality of graphic frames of the user interface, wherein the execute includes performing rendering functions and interpolating coordinates for animation, wherein to execute includes to execute the subset of the first plurality of drawings commands of the execution buffer; and output the first plurality of graphic frames of the user interface to be displayed on the display.

13. The non-transitory machine-readable storage medium of claim 12, wherein the operations further comprise:

receive, at the receiving device, user input;

transmit one or more events representative of the user input to the base unit;

receive, from the base unit, a second part of the instruction stream that includes a second plurality of drawing commands for producing a second plurality of graphics frames that reflect a result of the received user input;

parse the received second part of the instruction stream to determine the second plurality of drawing commands and arguments of the second plurality of drawing commands;

execute the second plurality of drawing commands in the graphics engine to generate the second plurality of graphics frames; and output the second plurality of graphics frames to be displayed on the display.

14. The non-transitory machine-readable storage medium of claim 12, wherein the operations further comprise:

receive, at the receiving device from the base unit and from across the network, an encoded video stream;

decode the encoded video stream; and output the decoded video stream to be displayed on the display.

15. The non-transitory machine-readable storage medium of claim 12, wherein the instruction stream is lossless.

16. The non-transitory machine-readable storage medium of claim 12, wherein the operations further comprise:

receive, at the receiving device from a remote server, an encoded video stream;

decode the encoded video stream; and output the decoded video stream to be displayed on the display.

17. The non-transitory machine-readable storage medium of claim 16, wherein output of the first plurality of graphic frames of the user interface to be displayed on the display and output of the decoded video stream to be displayed on the display is to occur concurrently.

18. A non-transitory machine-readable storage medium that provides instructions that, when executed by a processor of a base unit, cause said processor to perform operations comprising:

receive, at the base unit that includes a first operating system and a second operating system that are separate from one another, one or more events related to a receiving device that is to be communicatively coupled with the base unit over a network, wherein the first operating system is dedicated for driving the receiving device and the second operating system is dedicated to operations of the base unit and performs tasks unrelated to processing events and user interface commands for the receiving device;

determine how the one or more events inform or direct an output of what is currently rendering on the receiving device;

generate, by the first operating system, an instruction stream that includes a plurality of drawing commands for producing a plurality of graphic frames of a user interface for the receiving device that correspond with the one or more events, wherein generation of the instruction stream does not include performing rendering functions in a graphics engine and producing interpolated coordinates for animation; and transmit, over the network, the generated instruction stream to the receiving device.

19. The non-transitory machine-readable storage medium of claim 18, wherein the operations further comprising:

encode a video stream to produce an encoded video stream; and transmit the encoded video stream to the receiving device.

20. The non-transitory machine-readable storage medium of claim 18, wherein the instruction stream is lossless.

21. The non-transitory machine-readable storage medium of claim 18, wherein the one or more events are received from user input at the receiving device.

22. The non-transitory machine-readable storage medium of claim 18, wherein the one or more events are received from user input at the base unit.

* * * * *